United States Patent
Wang

(10) Patent No.: US 9,199,430 B2
(45) Date of Patent: Dec. 1, 2015

(54) STITCHING TO-COMBINED COMPONENT OF TEXTILE AND PLASTIC

(71) Applicant: Mei-Li Wang, Taipei (TW)

(72) Inventor: Mei-Li Wang, Taipei (TW)

( * ) Notice: Subject to any disclaimer, the term of this patent is extended or adjusted under 35 U.S.C. 154(b) by 3 days.

(21) Appl. No.: 14/273,569

(22) Filed: May 9, 2014

(65) Prior Publication Data

US 2015/0251379 A1    Sep. 10, 2015

(30) Foreign Application Priority Data

Mar. 6, 2014 (TW) .............. 103203858 A

(51) Int. Cl.
| | |
|---|---|
| *A47G 1/06* | (2006.01) |
| *B32B 5/06* | (2006.01) |
| *B44C 5/04* | (2006.01) |
| *D04D 7/02* | (2006.01) |

(52) U.S. Cl.
CPC ... *B32B 5/06* (2013.01); *B44C 5/04* (2013.01); *D04D 7/02* (2013.01)

(58) Field of Classification Search
CPC ................. A47G 1/06; A47G 1/0616
USPC ............ 428/102, 13, 14, 542.6, 906.6, 913.3
See application file for complete search history.

(56) References Cited

U.S. PATENT DOCUMENTS 4,309,784 A * 1/1982 Cohen .............................. 5/639

* cited by examiner

*Primary Examiner* — Alexander Thomas
(74) *Attorney, Agent, or Firm* — Myers Bigel Sibley & Sajovec, P.A.

(57) ABSTRACT

Disclosed is a stitched-together textile and plastic component including an upper transparent plastic layer, a lower transparent plastic layer and a textile layer. The textile layer is stacked between the upper transparent plastic layer and the lower transparent plastic layer, wherein the textile layer and the lower transparent plastic layer are stitched together by a decorative stitch in such a manner that a sewing pattern is formed above the textile layer and below the lower transparent plastic layer, and the decorative stitch is applied to combine the upper transparent plastic layer with the previously stitched-together textile layer and lower transparent plastic layer by stitching in such a manner that another sewing pattern which overlaps the sewing pattern to form an overlapping pattern above the upper transparent plastic layer, by which the characteristics of the upper and lower transparent plastic layers such as waterproofing, antifouling, rigidity and durability are combined with the various texture of the textile layer to applied in the manufacturing of everyday items.

6 Claims, 6 Drawing Sheets

STITCHING TO-COMBINED COMPONENT OF TEXTILE AND PLASTIC

FIELD OF THE INVENTION

The present invention relates to a planar working component, and more particularly to a stitched-together textile and plastic component.

BACKGROUND OF THE INVENTION

There are tens of thousands of everyday items used in our daily life, such as bags, shoes, and raincoats. These everyday items perform various kinds of functions and possess various effects according to their diverse materials. For example, a raincoat made of nylon is capable of being waterproof and bags made of varying leather types offer different textures and functions. Moreover, other plastics and textile materials are commonly used as well. An item made of plastic has the merits of waterproofing, antifouling, rigidity and durability and an item made of a textile material is richer and more varied in texture, pattern and feel although it is not as good as a plastic material in terms of waterproofing, antifouling, rigidity and durability. Therefore textile materials are just as popular as plastic materials for producing everyday items, such as handbags.

SUMMARY OF THE INVENTION

However, an item made of a single material of either plastic or a textile material is considered to be lacking in quality and variation in style or having limited performances in waterproofing, antifouling, rigidity and durability. Items made of a single material of either plastic or textile cannot bring both advantages at the same time.

Therefore, the objective of the present invention is to provide a stitched-together textile and plastic component which not only possesses the benefits of a plastic item such as waterproofing, antifouling, rigidity, durability and so on, but also maintains the characteristics of textiles including the advantages of texture and variation in pattern. Thus the component can be applied in the manufacturing of a wide range of bags, shoes, raincoats and various other everyday items.

The stitched-together textile and plastic component comprises an upper transparent plastic layer, a lower transparent plastic layer and a textile layer being stacked between the upper transparent plastic layer and the lower transparent plastic layer, wherein the textile layer and the lower transparent plastic layer are stitched together by a decorative stitch in such a manner that a sewing pattern is formed above the textile layer and below the lower transparent plastic layer, and the decorative stitch is applied to combine the upper transparent plastic layer with the previously stitched-together textile layer and lower transparent plastic layer by stitching in such a manner that another sewing pattern which overlaps the sewing pattern to form an overlapping pattern above the upper transparent plastic layer.

According to an embodiment of the present invention, the present invention further includes an outer frame combined with a main body, and the outer frame includes an upper frame layer and a lower frame layer, wherein the upper frame layer is disposed on the upper transparent plastic layer, and the lower frame layer is arranged below the lower transparent plastic layer.

According to an embodiment of the present invention, the textile layer is a lace layer, a weave layer, a gauze layer, or a mesh layer.

According to an embodiment of the present invention, the outer frame is a leather, a metal, a plastic, a weave textile or a cloth frame.

According to an embodiment of the present invention, the outer frame is provided with a plurality of hollow cut portions.

According to an embodiment of the present invention, the present invention further includes an ornamenting element that is combined with the textile layer, wherein the ornamenting element is a metal ornamenting element, a jewelry ornamenting element, a plastic ornamenting element or a glass ornamenting element.

By means of technical means of the present invention, the transparent plastic layer is combined with the textile layer by the decorative stitch in different stitching together methods to form a novel component, in which a textile layer is stacked between two translucent plastic layers or between two transparent plastic layers to not only possess various texture and variety but also maintain the merits of waterproofing, antifouling, rigidity and durability as found in a plastic item. Accordingly, the component of the present invention is suitable to be applied in the manufacturing of bags, shoes, raincoats, and other everyday items.

BRIEF DESCRIPTION OF THE DRAWINGS

The structure and the technical means adopted by the present invention to achieve the above and other objects can be best understood by referring to the following detailed description of the preferred embodiments and the accompanied drawings.

DETAILED DESCRIPTION OF THE PREFERRED EMBODIMENTS

The embodiments of the present invention are described herein with reference to FIGS. 1 to 8. The descriptions herein should not be taken as limiting the present invention but is only for illustrating the present invention.

Figure 1:
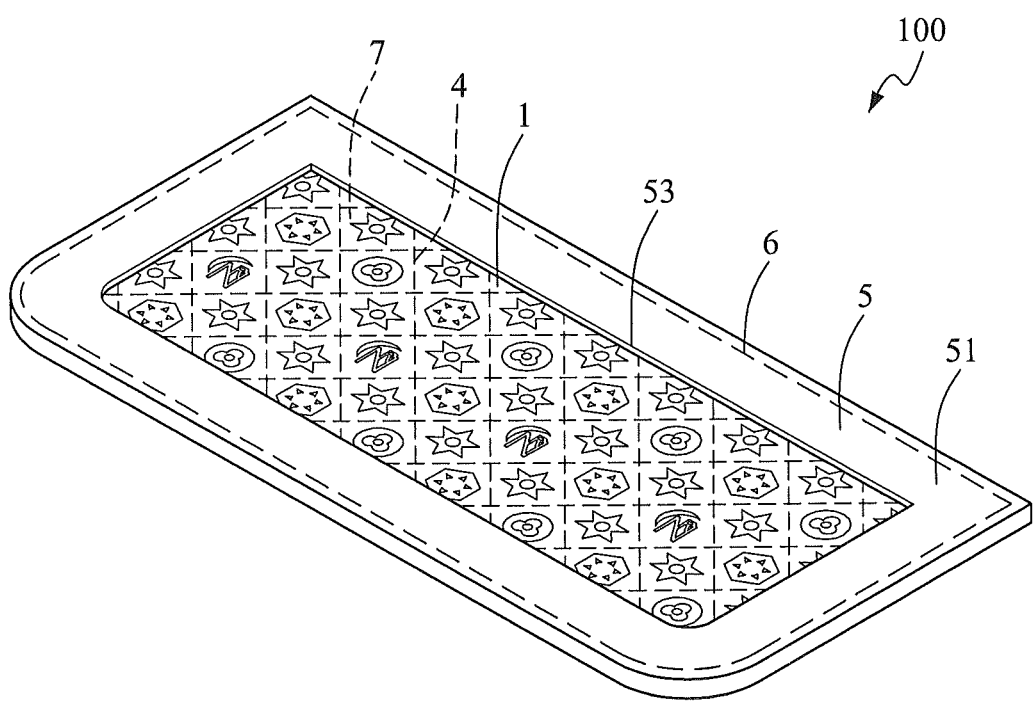
FIG. 1 is a stereogram illustrating a stitched-together textile and plastic component according to a first embodiment of the present invention.
Figure 2:
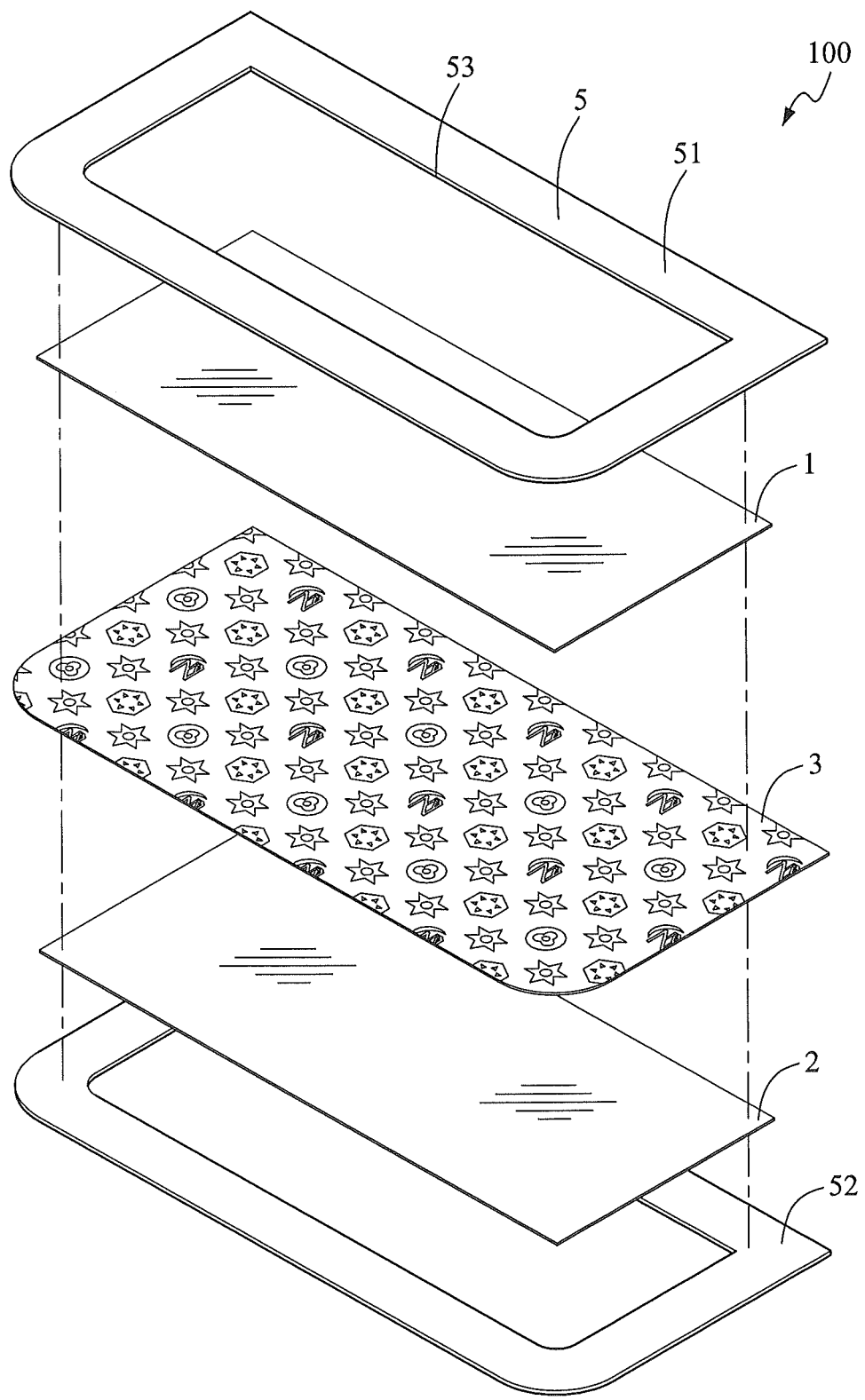
FIG. 2 is an exploded view of the stitched-together textile and plastic component according to the first embodiment of the present invention.
Figure 3:
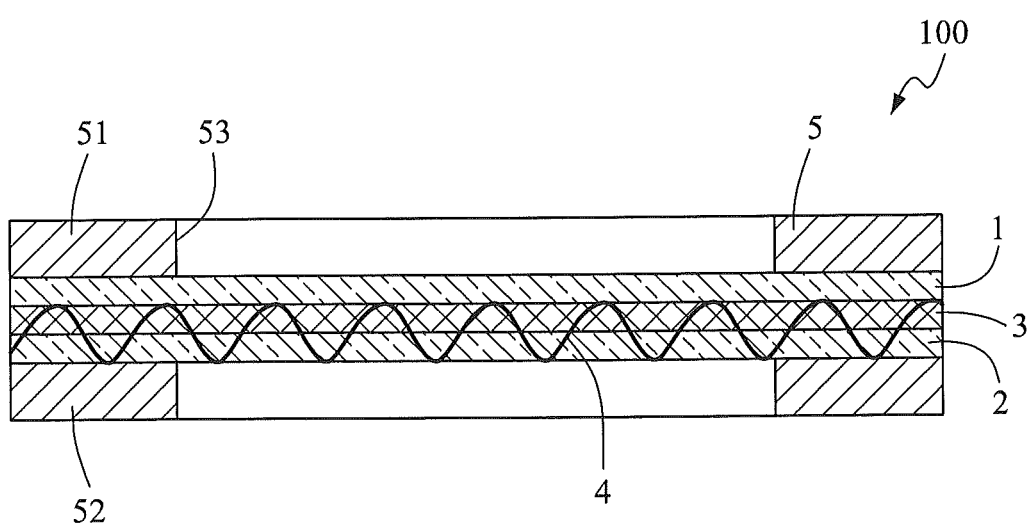
FIG. 3 is a sectional view of the stitched-together textile and plastic component according to the first embodiment of the present invention.

As referring to FIGS. 1 to 3, a stitched-together textile and plastic component 100 according to a first embodiment of the present invention mainly includes an upper transparent plastic layer 1, a lower transparent plastic layer 2 and a textile layer 3.

In this embodiment, the upper transparent plastic layer 1 and the lower transparent plastic layer 2 can be transparent plastic layers or translucent plastic layers whose material can be selected from polyethylene, polypropylene, polystyrene, or thermoplastic polyurethane. The material of the upper transparent plastic layer 1 can be different from that of the lower transparent plastic layer 2. For example, when the material of the upper transparent plastic layer 1 is polystyrene, the material of the lower transparent plastic layer 2 is polyethylene, so that the two transparent plastic layers can have different transparency. The textile layer 3 is stacked between the upper transparent plastic layer 1 and the lower transparent plastic layer 2, and in this embodiment, it is a weave textile layer, but also can be a lace layer, a gauze layer, or a mesh layer.

The upper transparent plastic layer 1, the lower transparent plastic layer 2 and the textile layer 3 are mainly combined by a decorative stitch 4. In this embodiment, the textile layer 3 and the lower transparent plastic layer 2 are stitched together by the decorative stitch 4 in such a manner, that a sewing pattern 7 is formed above the textile layer 3 and below the lower transparent plastic layer 2. In this embodiment, the sewing pattern 7 formed by the decorative stitch 4 is an argyle pattern. However, the present invention is not limited to this. The sewing pattern 7 may have a polygon shape, a circle shape or any other shape in its pattern, and may be a pattern designed according to type, texture or characteristics of the textile object. The upper transparent plastic layer 1 is disposed on the textile layer 3 with which the lower transparent plastic layer 2 is stitched to in order to protect the sewing pattern 7 from its thread breaking, stains or damage.

Specifically, in this embodiment, the upper transparent plastic layer 1 and the stitched lower transparent plastic layer 2 and textile layer 3 are combined by an outer frame 5. The outer frame 5 includes an upper frame layer 51 and a lower frame layer 52. The upper frame layer 51 is disposed on the upper transparent plastic layer 1, and the lower frame layer 52 is arranged below the lower transparent plastic layer 2. The upper frame layer 51 and the lower frame layer 52 are stitched together by an outer frame stitch 6 so that the upper transparent plastic layer 1 and the stitched lower transparent plastic layer 2 and textile layer 3 are stacked between the upper frame layer 51 and the lower frame layer 52. A window portion 53 that is a carved out portion in the centre of the upper frame layer 51 and the lower frame layer 52 is provided for allowing the textile layer 3 and the sewing pattern 7 to be viewed therethrough. In this embodiment, the window portion 53 is a square-shaped hole. However, the present invention is not limited to this. The window portion 53 can be in a circle shape, a polygon shape or any other different shape. Besides, the window portion 53 can be adjusted to different dimensions according to the range of the textile layer 3 and the sewing pattern 7 that is desired to be viewed. Optionally, the upper frame layer 51 and the lower frame layer 52 are leather frames made of, for example, genuine leather or synthetic leather. However, the present invention is not limited to this. The materials of the upper frame layer 51 and the lower frame layer 52 can be selected from metal, plastic, weave textile, cloth, and other materials. Furthermore, the material of the upper frame layer 51 and the material of the lower frame layer 52 can be different. For example, the upper frame layer 51 is made of genuine leather and the lower frame layer 52 is made of cloth.

Figure 4:
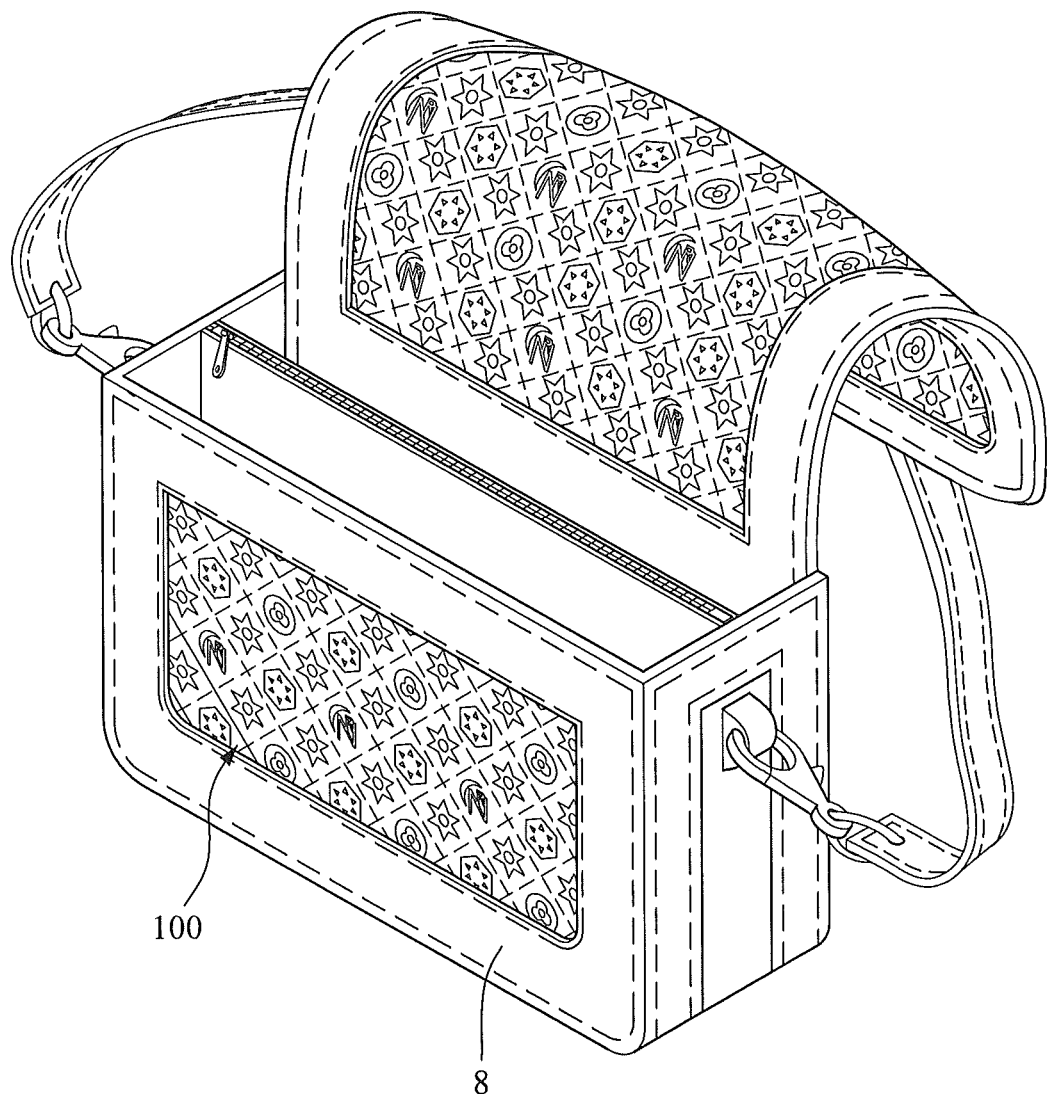
FIG. 4 is a schematic diagram illustrating a bag made of the stitched-together textile and plastic component according to the first embodiment of the present invention.

By means of the aforementioned structure, the stitched-together textile and plastic component 100 possesses characteristics such as waterproofing, antifouling, rigidity, and durability as derived from the upper transparent plastic layer 1 and the lower transparent plastic layer 2, and maintains the merits of texture, various patterns, color, and varied sewing pattern 7 that can be viewed through the transparent plastic layer as obtained from the textile layer 3, such that it is suitable to be applied in the manufacturing of everyday items. For example, the stitched-together textile and plastic component 100 is suitable to be used in producing a bag 8, because the rigidity of the upper transparent plastic layer 1 and the lower transparent plastic layer 2 is being applied to the textile layer 3 which can be used as a cover for preventing the inside contents of a bag 8 from being seen, as seen in FIG. 4. Therefore the bag 8 possesses at once both the merits of functionality and personal privacy.

Figure 5:
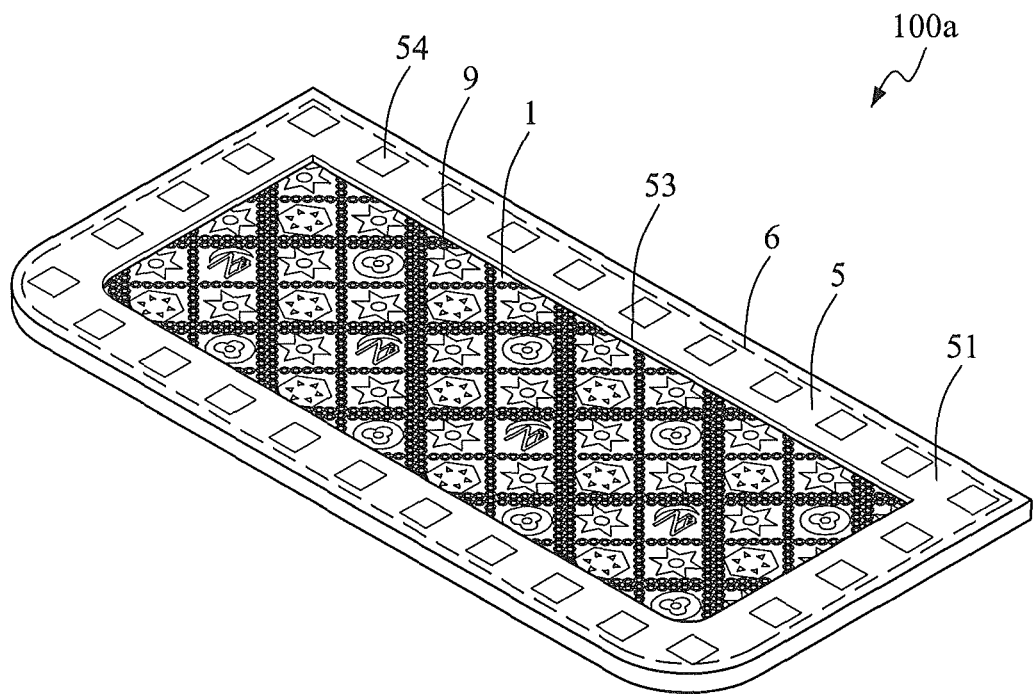
FIG. 5 is a stereogram illustrating the stitched-together textile and plastic component according to a second embodiment of the present invention.

As shown in FIG. 5, a stitched-together textile and plastic component 100a according to the second embodiment of the present invention is illustrated, in which the outer frame 5 is provided with a plurality of hollow cut portions 54. Particularly, the hollow cut portions 54 can be any shape, for example, as shown in FIG. 5, in which the hollow cut portions 54 are square-shaped. In this embodiment, the hollow cut portions 54 are located at regular intervals on the frame portion of the outer frame 5 around the window portion 53. However, the present invention is not limited to this. The hollow cut portions 54 may be irregularly arranged or arranged in a staggered formation on the outer frame 5. In addition, the outer frame 5 may be formed by weaving a combined a plurality of bars such as leather bars, Chinese knot bars, etc., and the distances between the bars are adjustable to form the window portion 53 or the hollow cut portions 54.

In addition to combining the upper transparent plastic layer 1 and the stitched textile layer 3 and lower transparent plastic layer 2 by means of the outer frame 5, other methods of combination, such as sticking, fastening, or hot melting, can be applied. The fastening method can be performed by, for example, buttoning with buttons and the hot melting method is by heating the upper transparent plastic layer 1 to thus fuse the upper transparent plastic layer 1 to the stitched textile layer 3 and lower transparent plastic layer 2. Preferably, the outer frame 5 can be selected replaced by means of buttoning, sticking, or any other detachable combined methods.

Alternatively, the textile layer 3 can further be combined with an ornamenting element 9. The ornamenting element 9 may be a metal ornamenting element, a jewelry ornamenting element, a plastic ornamenting element, or a glass ornamenting element. For instance, the metal ornamenting element may be a rivet or a chain. A jewelry ornamenting element may be a gemstone or an amber. A plastic ornamenting element may be a paillette or a bead. A glass ornamenting element may be a glass pearl. In this embodiment, the ornamenting element 9 is a paillette, which is combined with the textile layer 3 by means of stitching. Alternatively, different types of ornamenting elements, such as the paillette and the rivet, can be combined with the textile layer 3. As mentioned above, the practicality and the diversity of the stitched-together textile and plastic component 100 are further improved. In addition, the upper transparent plastic layer 1, the lower transparent plastic layer 2, and the textile layer 3 can be directly stitching-to-combined, and the detailed structure is described as follows.

Figure 6:
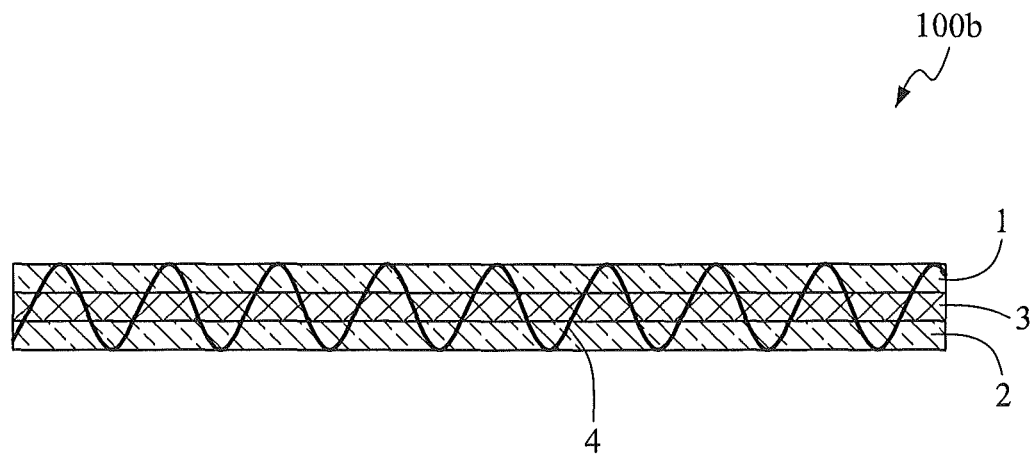
FIG. 6 is a sectional view of the stitched-together textile and plastic component according to a third embodiment of the present invention.

As shown in FIG. 6, in a stitched-together textile and plastic component 100b according to the third embodiment of the present invention, the upper transparent plastic layer 1, the lower transparent plastic layer 2, and the textile layer 3 are stitched together by the decorative stitch 4 in such a manner that a sewing pattern 7 is formed above the upper transparent plastic layer 1 and below the lower transparent plastic layer 2. The structure mentioned above can be further combined with the outer frame 5 to have a stronger combination between all of these layers.

Figure 7:
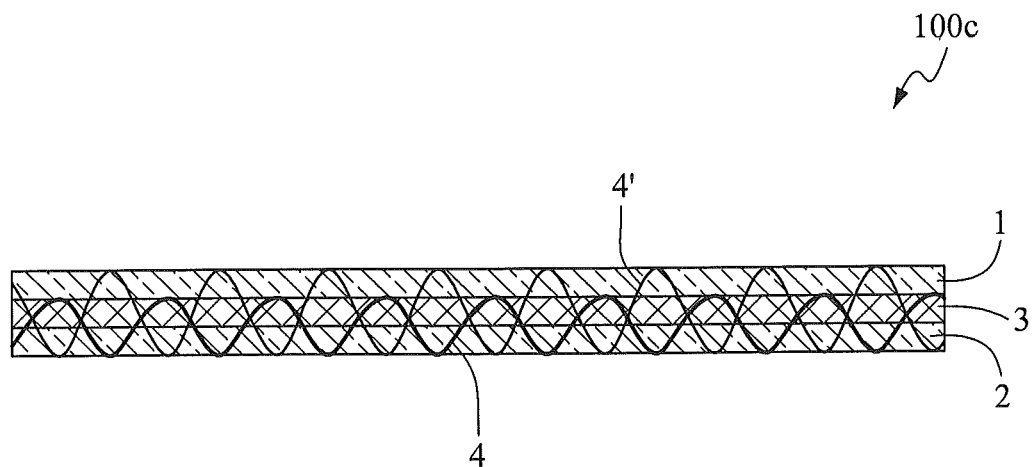
FIG. 7 is a sectional view of the stitched-together textile and plastic component according to a forth embodiment of the present invention.
Figure 8:
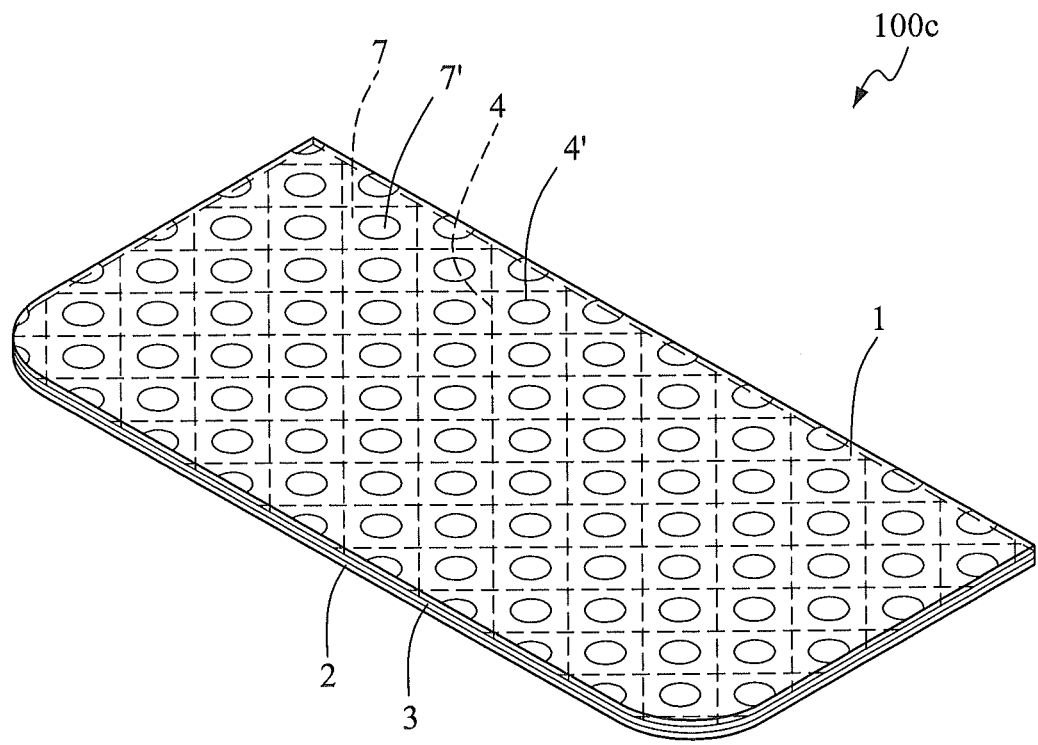
FIG. 8 is a stereogram illustrating the stitched-together textile and plastic component according to the forth embodiment according of the present invention.

As shown in FIGS. 7 and 8, in a stitched-together textile and plastic component 100c according to the forth embodiment of the present invention, the textile layer 3 and the lower transparent plastic layer 2 are stitched together by the decorative stitch 4 in such a manner that the sewing pattern 7 is formed above the textile layer 3 and below the lower transparent plastic layer 2. Another decorative stitch 4' is applied to combine the upper transparent plastic layer 1 with the previously stitched-together textile layer 3 and lower transparent plastic layer 2 by stitching in such a manner that another sewing pattern 7' that overlaps the sewing pattern 7 to form an overlapping pattern. The overlapping pattern formed by the two sewing patterns 7 and 7' is more plentiful, diverse, and firm in structure that can prevent thread loosening.

The above description should be considered as only the discussion of the preferred embodiments of the present invention. However, a person with an ordinary skill in the art may make various modifications to the present invention and those modifications still fall within the spirit and scope defined by the appended claims.

What is claimed is:

1. A stitched-together textile and plastic component, comprising:
    an upper transparent plastic layer;
    a lower transparent plastic layer; and
    a textile layer being stacked between the upper transparent plastic layer and the lower transparent plastic layer, wherein the textile layer and the lower transparent plastic layer are stitched together by a decorative stitch in such a manner that a sewing pattern is formed above the textile layer and below the lower transparent plastic layer, and the decorative stitch is applied to combine the upper transparent plastic layer with the previously stitched-together textile layer and lower transparent plastic layer by stitching in such a manner that another sewing pattern which overlaps the sewing pattern to form an overlapping pattern above the upper transparent plastic layer.

2. The stitched-together textile and plastic component as claimed in claim 1, further including an outer frame combined with a main body, and the outer frame including an upper frame layer and a lower frame layer, wherein the upper frame layer is disposed on the upper transparent plastic layer, and the lower frame layer is arranged below the lower transparent plastic layer.

3. The stitched-together textile and plastic component as claimed in claim 2, wherein the outer frame is a leather, a metal, a plastic, a weave textile or a cloth frame.

4. The stitched-together textile and plastic component as claimed in claim 2, wherein the outer frame is provided with a plurality of hollow cut portions.

5. The stitched-together textile and plastic component as claimed in claim 1, wherein the textile layer is a lace layer, a weave layer, a gauze layer or a mesh layer.

6. The stitched-together textile and plastic component as claimed in claim 1, further including an ornamenting element that is combined with the textile layer, wherein the ornamenting element is a metal ornamenting element, a jewelry ornamenting element, a plastic ornamenting element or a glass ornamenting element.

* * * * *